United States Patent
Zikeli et al.

(10) Patent No.: US 7,303,710 B2
(45) Date of Patent: Dec. 4, 2007

(54) METHOD AND DEVICE FOR EXTRUDING A CONTINUOUS MOULDED BODY

(75) Inventors: Stefan Zikeli, Regau (AT); Friedrich Ecker, Timelkam (AT)

(73) Assignee: Zimmer A.G., Frankfurt am Main (DE)

( * ) Notice: Subject to any disclaimer, the term of this patent is extended or adjusted under 35 U.S.C. 154(b) by 535 days.

(21) Appl. No.: 10/343,547

(22) PCT Filed: Apr. 25, 2001

(86) PCT No.: PCT/EP01/04689

§ 371 (c)(1),
(2), (4) Date: Jul. 14, 2003

(87) PCT Pub. No.: WO02/12600

PCT Pub. Date: Feb. 14, 2002

(65) Prior Publication Data

US 2004/0021246 A1    Feb. 5, 2004

(30) Foreign Application Priority Data

Aug. 3, 2000    (DE) .............................. 100 37 922

(51) Int. Cl.
  B29C 47/30    (2006.01)
  B29C 47/92    (2006.01)
(52) U.S. Cl. ................ 264/187; 264/40.7; 264/172.16; 425/113; 425/131.1
(58) Field of Classification Search ................ 264/187, 264/203, 211.12, 211.14, 211.16
See application file for complete search history.

(56) References Cited

U.S. PATENT DOCUMENTS

| | | | |
|---|---|---|---|
| 4,869,860 A * | 9/1989 | Lewis, Jr. .................... 264/180 |
| 5,230,852 A * | 7/1993 | Golmanavich ......... 264/171.13 |
| 5,417,909 A * | 5/1995 | Michels et al. ........ 264/177.13 |
| 5,653,931 A * | 8/1997 | Eibl et al. .................... 264/187 |
| 5,780,067 A * | 7/1998 | Herrington, Jr. ......... 425/131.1 |
| 6,706,224 B2 * | 3/2004 | Firgo et al. ................. 264/103 |
| 7,056,112 B2 * | 6/2006 | Ulcej .......................... 425/461 |
| 7,147,449 B2 * | 12/2006 | Topf ........................ 425/131.1 |

FOREIGN PATENT DOCUMENTS

| | | |
|---|---|---|
| GB | 720 187 | 12/1954 |
| JP | 59228012 A | 12/1984 |
| WO | WO 98/18983 * | 5/1998 |

* cited by examiner

Primary Examiner—Monica A Huson
(74) Attorney, Agent, or Firm—McDonnell Boehnen Hulbert & Berghoff LLP

(57) ABSTRACT

The present invention relates to an apparatus and a method as well as a system for extruding continuously molded bodies for producing filaments or staple fibers from an extrusion solution, such as a cellulose solution containing water, cellulose and tertiary amine oxide such as N-methylmorpholine N-oxide. In comparison with the methods known from the prior art, profitability can be increased in the production of continuously molded bodies (3) if the extrusion rate v is set to a value $v = B \cdot T^{0.33} \cdot 10,000 \cdot (1/r^2)$. In a system, profitability can be enhanced if the number r of rows is $r = [(B/v) \cdot 10,000 \cdot T^{0.33}]^{1/2}$. T is here the fiber titer in T dtex, v the extrusion rate in m/min, r the number of the rows of extrusion duct orifices (12), and B an operational parameter which is not more than 4 and at least 0.5.

9 Claims, 2 Drawing Sheets

METHOD AND DEVICE FOR EXTRUDING A CONTINUOUS MOULDED BODY

The invention also relates to an extrusion head for extruding a continuously molded body from an extrusion solution, in particular an extrusion solution containing water, cellulose and tertiary amine oxide, comprising a plurality of extrusion ducts through which the extrusion solution is passed at an extrusion rate to an extrusion duct orifice, the extrusion solution being extrudable through the extrusion duct orifice into a continuously molded body. Extrusion heads comprising said features are also known from WO 93/19230, WO 95/04173 and from WO 98/18983.

The extrusion heads described therein have the drawback, as already stated above, that a high hole density can only be achieved with high constructional efforts; moreover, the operation of the conventional systems including blowing and sucking operations is rendered difficult because of the poor accessibility for the operating personnel. In this context, a high profitability of the method corresponds to combining a high hole density with a large number of holes each spinning location.

Therefore, it is the object of the present invention to increase the profitability in a generic extrusion head by keeping the constructional efforts or costs as small as possible. An easy operability while maintaining the excellent properties of the molded bodies is also to be ensured according to the invention. The excellent properties are e.g. uniform strength, elongation, molded bodies that do not stick together.

The fiber products manufactured according to the method of the invention have the same textile fiber data as lyocell fibers which are produced according to the prior art.

This objective is achieved according to the invention for a generic extrusion head in that the number of rows r of extrusion duct orifices of the extrusion head, in dependence upon the fiber titer T in dtex, the take-off rate v in m/min and an operational parameter B, is $$r=[(B/v)\cdot 10{,}000\cdot T^{0.33}]^{1/2}$$

where the operational parameter B has a value of not more than 4.

With such a design of the extrusion head maximum hole densities can also be achieved without any blowing operation, and the profitability over the known prior art can be increased considerably.

In the apparatus the operational parameter is also not more than 3.5 or not more than 3 in a further advantageous development. For all designs the operational value B should not fall below the value 0.5 because of the profitability demanded for spinning systems.

Finally, the invention relates to a system for extruding a continuously molded body, the system comprising at least one extrusion head according to the invention.

Such a system includes, for instance, the production of a spinning substance or compound and known process steps preceding the production of the spinning material, process steps following the spinning material production, e.g. filtration, as well as one or several supply tanks for the extrusion solution, a line system which may be equipped with temperature control devices and pressure relief means. The extrusion solution is conveyed through the line system by means of pumps from the supply tank to the extrusion head. Finally, the system may also comprise one or more compensating containers which compensate pressure and volume flow variations within the line system and are to ensure a constant feeding of the extrusion head.

For controlling v and thus, at a given amount of spinning material, also the titer T, one or more take-off units are provided, depending on the design of the system. Furthermore, the system consists of the known machines and devices that may differ in design, depending on the type of system, and are used for cutting, washing, aftertreating, drying, opening, pressing and packaging the fibers produced.

In the direction of extrusion an air gap is normally arranged downstream of the extrusion head for passing the continuously molded body therethrough. Since the extrusion duct orifices are arranged in rows and, in an advantageous development, very close to one another, the individual, continuously molded bodies form a substantially planar wide-spread curtain. To increase the width of the curtain and thus the profitability of the method and the apparatus, the extrusion head may be considerably extended or elongated, in particular in the direction of the rows, in comparison with the direction perpendicular thereto.

After having crossed the air gap, the curtain being composed of the individual, continuously molded bodies enters a precipitation bath which is preferably held in a tub. In the tub the wide-spread curtain is deflected by a deflector and guided to a collector in which the continuously molded bodies are converged substantially towards one point.

The collector may preferably be arranged outside the precipitation bath.

In combination with the inventive guidance and deflection of the produced bundle of spun filaments as a wide-spread flat tape or web into a spin tub—according to the former prior art the spun filaments of one spinning position are already converged towards one point in the spin bath—each individual spinneret can now be made considerably longer in the direction of the rows as compared to conventionally known spinnerets.

In contrast to the broad or wide-spread guidance of the bundle of filaments according to the invention, when the cable-linke bundle of fibers is covnerged at one point in the spin bath area according to the prior art, the bundling angle which considerably increases with an increasing nozzle size has a disadvantageous effect.

In the prior art, when the fiber bundle is converged at one point, the polymer jet exiting from the nozzle is strongly deflected at the nozzle exit edge in the case of a large bundling angle, which impairs the extrusion and spinning process. Since the bundling angle increases with an increasing size of the nozzles, the size of the nozzles is limited.

The large bundling angle also affects flow processes and bath displacement in the bundle of fibers; increased turbulences and backflows in the spin bath are present at great bundling angles.

WO 96/20300 deals with this problem by indicating an equation for the maximally admissible bundling angle for a spinning system with a point-like deflector in the spin bath. However, large immersion depths are the consequence of the bundling angles according to this equation in the case of large diameters of the nozzle. In addition, the great immersion depths have a negative effect on operability; moreover, the frictional forces are increased between bundle of filaments and spin bath and at the deflection point of the deflector.

A further problem arising in the design according to WO 96/20300 is the difficult exchange of spin bath liquor within the bundle of filaments. A multitude of filament rows are needed for an economic design of a single spinning position of such a type with ring nozzles. A point-like deflection results in a filament cone whose spin bath volume must constantly be exchanged for preventing excessively great differences in concentration. On account of the ring-like shape it is not only the spin bath directly surrounding the spun filaments that must be replaced through the spun filaments, but also the spin bath volume that is enclosed by the filament cone. This leads to increased loads on the individual spun filaments, but also to turbulences that affect the spinning process.

WO 94/28218 illustrates another approach; in this document the bundle of filaments exiting from a rectangular nozzle is guided through a spin bath tank which is provided at its lower nd with an exit opening through which the bundle of filaments is bundled at one point and discharged from the spin bath system.

This system is also limited in its profitability because of the demand that excessively large bundling angles should be avoided. To keep the bundling angle small, great immersion depths are also needed in this type of design with all of the above-described negative effects. In addition the great immersion depth effects a high spin-bath exit speed at the exit opening located at the bottom. This high spin-bath exit speed affects the spinning process during the initial spinning operation and also during operation because of the turbulences arising. The high bath exit speed may affect the filament run in the form of separate filaments which are entrained by the high bath exit speed and are not deflected in a stretched state at the deflection point below the spin bath exit, but flex downwards. Moreover, at an increased filament number per spinning location a larger exit opening is needed, whereby considerable amounts of spin bath must be circulated that create turbulences in addition.

The spin bath tanks illustrated in WO 94/28218 and WO 96/20300 also affect the initial spinning operation and the handling at the spinning locations quite considerably in combination with the necessary large immersion depths.

To permit the manipulation of the spun filament bundle, which is above all required during initial spinning, along the immersion path by the hand of an operator despite the limited arm length of said operator, additional devices are needed.

As stated in said patent specifications, the necessary access is provided either by openings (doors) (in WO 94/28218) or by additional lifting devices (in WO 96/20300) for lifting and lowering the spin bath tank.

These additional devices are tantamount to higher costs, thereby reducing the profitability quite considerably.

It is possible owing to the wide-spread deflection of the filament bundle according to the invention, e.g. as a curtain, to considerably increase the nozzle length and thus the profitability of a spinning location, as has already been stated above.

In addition, the immersion depth can be reduced to the degree required for coagulation because of the wide-spread guiding of the filament bundle in the precipitation bath. With this measure the following problems found in spinning systems according to the prior art can be solved or minimized:

In contrast to a ring nozzle, a rectangular shape of the nozzle does not result in an enclosed spin bath cone that must be displaced in addition.

The displacement processes by the filament bundle in the spin bath are minimized, whereby turbulences and black-flows are avoided.

The frictional forces between spin bath and filament bundle and thus the frictional forces acting on the deflector are minimized.

Thanks to the deflection in the spin bath tank the lower exit opening is omitted, thereby preventing the associated negative effects on spinning behavior, turbulences and handling.

The access which is above all required in the initial spinning process for manipulating the spun filament bundle along the immersion path by hand is considerably simplified owing to the strongly reduced immersion depth.

The constructional efforts and thus the costs for such a system are considerably reduced.

Finally, when a multitude of extrusion heads equipped according to the invention are used in a spinning system, each extrusion head may have assigned thereto a deflector by which the curtain respectively produced by the extrusion head is deflected in the spin bath.

The apparatus according to the invention as well as the method according to the invention will now be explained in more detail with reference to an embodiment.

Figure 1:
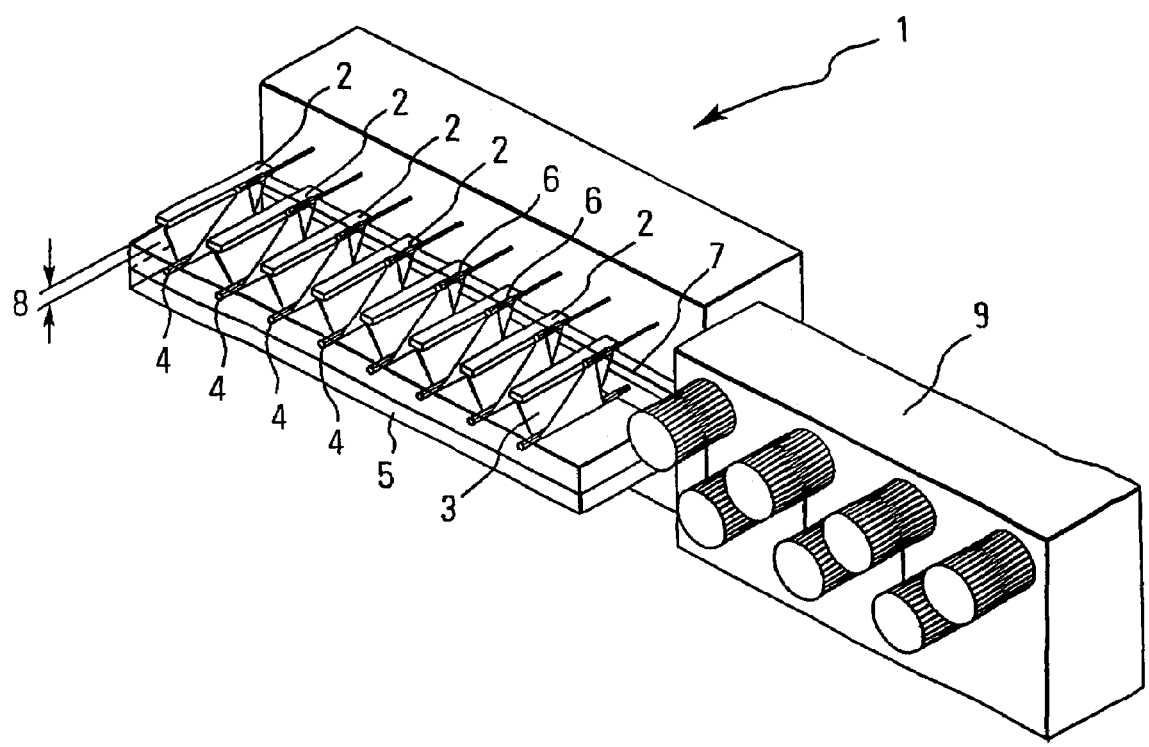
FIG. 1 is a schematic illustration of an embodiment of an apparatus according to the invention for performing the method according to the invention.

First of all, the structure of an embodiment shall be explained with reference to FIG. 1. FIG. 1 shows a system 1 for extruding an extrusion solution containing water, cellulose and N-methylmorpholine N-oxide (NMMO). This extrusion solution is spun in the system of FIG. 1 into continuously molded bodies in the form of filaments which can be cut in a further step of the method, which is here not shown, into staple fibers as well. The system 1 comprises a row of extrusion heads 2 oriented into an x- and y-direction.

Furthermore, the system comprises a supply tank (not shown) in which the extrusion solution is kept. The extrusion solution is conveyed by means of pumps (not shown) from the supply tank through a preferably heated line system (not shown) to the extrusion heads. In the line system a compensating tank (not shown) is arranged which ensures a uniform transportation of the extrusion solution to the extrusion head even in case of pressure and/or volume flow variations in the line system.

The extrusion heads 2 have substantially the shape of a rod. The extrusion solution is passed through the extrusion heads and is there extruded into continuously molded bodies 3. The continuously molded bodies 3 exit from the extrusion head in the form of a curtain. The curtain is deflected to a collector 6 by means of a deflector 4 which is arranged in a precipitation bath 5. At the collector the curtain 3 is converged substantially towards a single point. The continuously molded bodies pass from the collector 6 as a bundle of fibers 7 to a device 8 at which the take-off rate or velocity v is set.

The deflector 4 and the collector 6 are designed as a cylinder or roller in the embodiment of FIG. 1. The cylinders or rollers may be designed such that they are stationary or passively rotating or are rotatingly driven. The devices 4 and 6 may also be designed as profiled supported rollers or cylinders with or without a lateral boundary.

An air path or air gap 8 is located between the extrusion heads 2 and the spin bath surface 5 into which the continuously molded bodies of a single extrusion head immerse as a substantially planar curtain of individual and continuously molded bodies.

Figure 2:
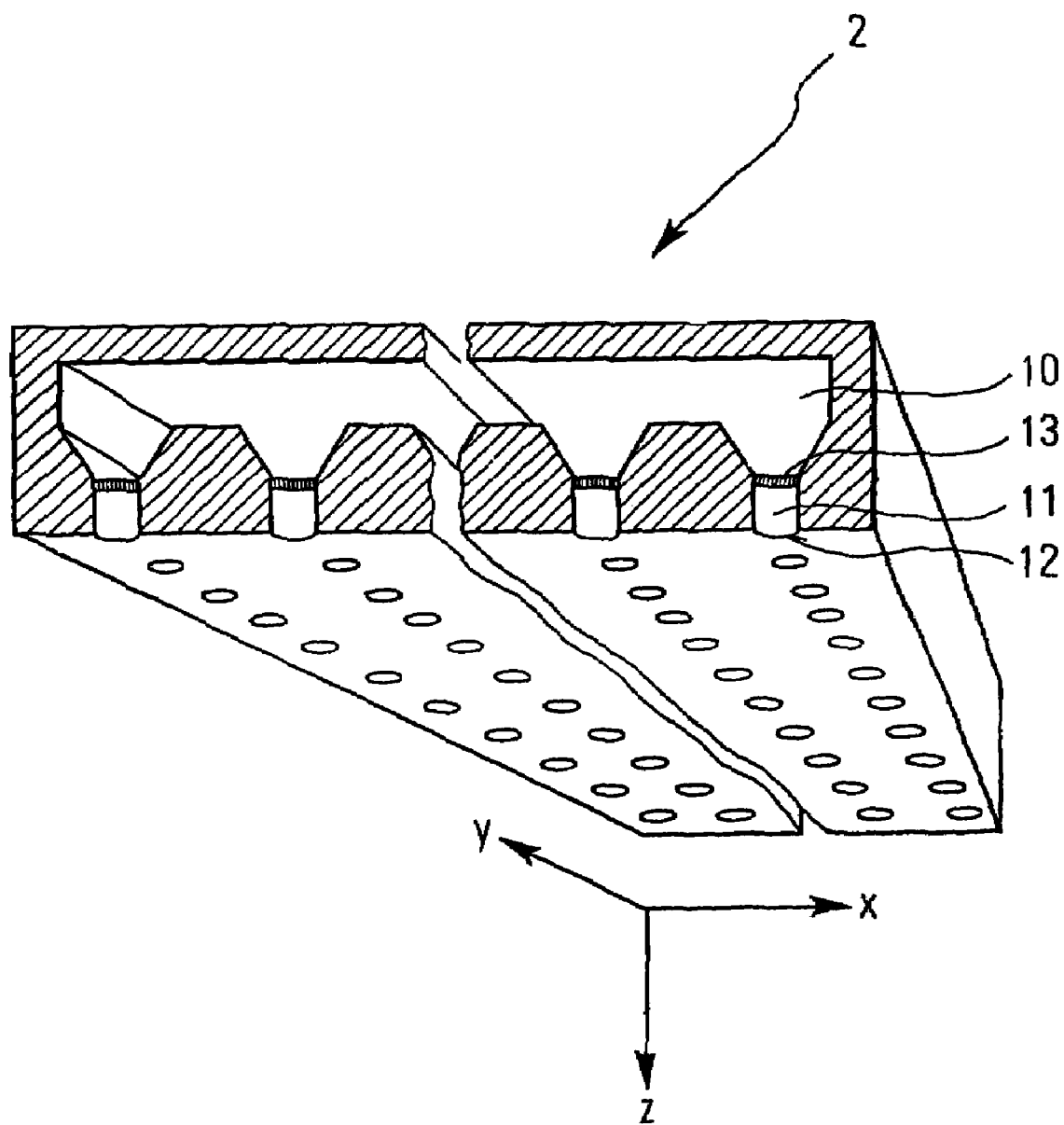
FIG. 2 is a schematic sectional view of an extrusion head according to the invention.

FIG. 2 schematically shows the cross section through an extrusion head 2.

The extrusion solution is first guided in the extrusion head through a collecting line or manifold 10. Extrusion ducts 11 are branched off from the collecting line and terminate in an extrusion duct orifice 12.

Means 13 are provided between the collecting line 10 and the extrusion duct 11 for making the flow uniform and for evenly distributing the material flow through the individual extrusion ducts. These flow means may e.g. have the shape of sieves or filters.

The extrusion head in FIG. 2 has a number r of rows of extrusion duct orifices 12, the rows being arranged in parallel in the x-direction.

The rows of the flow duct orifices 12 extend in y-direction. Only the two outer rows of extrusion duct orifices 12 are shown in FIG. 2 by way of example. The extrusion solution is extruded from the individual extrusion duct orifices 12 in extrusion direction z. In the case Of the rod-shaped extrusion heads according to the invention considerably more extrusion duct orifices 12 are arranged in the Y-direction than rows are present in the X-direction.

That is why the extrusion solution exits from an extrusion head 2 substantially as a curtain.

At a given number r of rows and the necessary titer T the take-off rate v is controlled in system 1 by means of a control device. (not shown) of the system 1 in such a way that it is $$v = B \cdot T^{0.33} \cdot 10,000 \cdot (1/r^2)$$

where B is a value of not more than 4 and T is the fiber titer T in dtex. In this range the spinning reliability of the extrusion head 2 is very high, so that a troublefree spinning operation is possible at a high spinning stability.

The take-off rate for adjusting the fiber fineness is indicated in m/min. One skilled in the art will adjust the extrusion rate of the spinning solution through the extrusion duct orifice in dependence upon the capillary diameter and the cellulose concentration in such a manner that at a given take-off rate the necessary fiber titer can be achieved.

Furthermore, the extrusion head in FIG. 2 is designed such that it has a number r of rows in x-direction for the rates v that are standard during operation, the number being $$r = [(B/v) \cdot 10,000 \cdot T^{0.33}]^{1/2}.$$

On the basis of the principle illustrated in the embodiment of FIGS. 1 and 2, the function of the operational parameter B shall now be described with reference to an example.

In a first variant an extrusion head 2 is used with 33 rows at a spinning rate of v=30 m/min and a fiber titer of T=1.3 dtex. The spinning characteristics of said extrusion head permit a reliable spinning operation.

A reduction of the number of rows r to 28 does not decisively improve the spinning characteristics. However, profitability decreases because of a smaller filament output.

By contrast, when number r is raised to 40 under these conditions, the operational parameter B rises to more than 4; a faultless and stable spinning process can no longer be guaranteed.

The operational parameter B was determined in a number of tests in which the achievable take-off rates and the resulting fiber titers were tested in dependence upon the number of rows of the respectively used nozzles.

According to the invention a spinning position or a system 1 may also comprise several extrusion heads arranged in x- and y-direction.

By the design and speed control according to the invention, a high profitability is ensured without a blowing operation.

The invention claimed is:

1. A method for extruding a continuously molded body for producing a filament or a staple fiber from an extrusion solution containing water, cellulose and tertiary amine oxide, the method comprising passing the extrusion solution through a plurality of extrusion ducts of at least one extrusion head to an extrusion duct orifice, the extrusion ducts being arranged in a predetermined number of rows, extruding the extrusion solution through the extrusion duct orifices at an extrusion rate v to produce an extruded, continuously molded body;

passing the extruded, continuously molded body through an air gap, wherein the extrusion rate v in m/min is a function of the number of rows r the fiber titer T in dtex, and an operational parameter B, and is given by $$v = B \cdot T^{0.33} \cdot 10,000 \cdot (1/r^2),$$

where the operational parameter B has a value of not more than 4.

2. The method according to claim 1, wherein the operational parameter has a value of not more than 3.5.

3. The method according to claim 1, wherein the operational parameter has a value of not more than 3.

4. The method according to claim 1, wherein the operational parameter has a value of at least 0.5.

5. The method according to claim 1, further comprising discharging the continuously molded body from the extrusion head through the air gap in the form of a curtain.

6. The method according to claim 5, further comprising passing the continuously molded body as a curtain through a precipitation bath.

7. The method according to claim 5, further comprising deflecting the curtain in a precipitation bath.

8. The method according to claim 7, further comprising converging the deflected curtain outside the precipitation bath towards substantially one point.

9. The method according to claim 1, further comprising passing the continuously molded body for producing a filament or a staple fiber from an extrusion solution in the air gap through substantially stagnant air.

* * * * *